United States Patent [19]

Warneke, deceased

[11] 3,875,418

[45] Apr. 1, 1975

[54] APPARATUS FOR CURING PHOTOPOLYMERIZABLE FILM FORMING POLYMER COATINGS

[75] Inventor: Carl J. Warneke, deceased, late of Chicago, Ill., by Mabel P. Warneke, administratrix

[73] Assignee: The Sherwin-William Company, Cleveland, Ohio

[22] Filed: Sept. 28, 1972

[21] Appl. No.: 292,850

Related U.S. Application Data

[62] Division of Ser. No. 148,024, May 28, 1971, Pat. No. 3,725,114.

[52] U.S. Cl. .................................. 250/527, 250/531

[51] Int. Cl. .................................. B01k 1/00

[58] Field of Search .............. 204/193, 168, 181 PC; 250/531, 527; 117/93.31, 93.1

[56] References Cited

UNITED STATES PATENTS 3,171,539 3/1965 Holbrook et al. .................... 204/168

*Primary Examiner*—Howard S. Williams

*Attorney, Agent, or Firm*—Johnston, Keil, Thompson & Shurtleff

[57] ABSTRACT

Photopolymerizable film-forming polymer coatings are cured by subjecting them to light waves within the range of 1,850 to 4,000 angstroms in the presence of an electrostatic field.

5 Claims, 2 Drawing Figures

APPARATUS FOR CURING PHOTOPOLYMERIZABLE FILM FORMING POLYMER COATINGS

This application is a division of U.S. application Ser. No. 148,024 filed May 28, 1971, which has now matured into U.S. Pat. 3,725,114.

BACKGROUND

It is known in the art to cure photopolymerizable film-forming polymer coatings on a substrate such as wood or metal or other suitable substrate by subjecting such coatings to light waves within the range of 1,850 to 4,000 angstroms. A process for the high energy curing of photopolymerizable non-air inhibited polyester resin coatings involving the use of light waves within the range of 1,850 to 4,000 angstroms is disclosed in U.S. Pat. No. 3,511,687. An apparatus for carrying out high intensity light curing is described in U.S. Pat. No. 3,564,728. One of the objects of light curing photopolymerizable film-forming polymer coatings is to cure the coatings sufficiently that they are mar resistant and to do this as rapidly as possible so that wooden panels or other substrate can be coated with a film-forming coating and the coating converted to a hard, mar resistant finish in a minimum period of time. In order to obtain a mar resistant finish it is usually necessary that the photopolymerizable polymer be fully cured. It would, therefore, be desirable to improve the curing which is obtainable by using a high energy light source.

OBJECTS

One of the objects of the present invention is to provide a new method of improving the curing of coatings containing photopolymerizable film-forming polymers.

A more specific object is to provide an improved method of curing photopolymerizable, non-air inhibited polyester resin coatings.

Still another object of the invention is to provide a new and improved method of curing photopolymerizable, non-air inhibited polyester resin coatings in which one of the components of the coating is a vinyl monomer, for example, styrene, which is cross linked with a polyester component to form a polyester resin.

An additional object of the invention is to provide a new and improved apparatus for curing film-forming coatings of photopolymerizable resins.

BRIEF SUMMARY OF THE INVENTION

In accordance with thhe invention a coating composition which has been applied to a substrate, for example, a wooden panel or a metal sheet or other suitable substrate and which contains a photopolymerizable film-forming polymer is subjected to light curing with light waves having wave lengths within the range of 1,850 to 4,000 angstroms in the presence of an electrostatic field of sufficient intensity to enhance the curing of said coating. The intensity of the electrostatic field is normally sufficient to produce a corona visible in a dark room.

In the practice of the invention the electrostatic field is usually produced by placing the coated substrate between two electrodes, one being a plate adapted to support the substrate and coextensive with the coating thereon, and the other being an electrically conducting screen positioned between the coating and the light source and having apertures therein which will permit the light waves from the light source to penetrate the coating.

THE DRAWINGS

Other objects and advantages of the invention will appear from the following description in conjunction with the accompanying drawings in which FIG. 1 illustrates one type of apparatus which can be employed in the practice of the invention; and FIG. 2 is a cross section taken through the apparatus shown in FIG. 1.

DETAILED DESCRIPTION OF THE INVENTION

Figure 1:
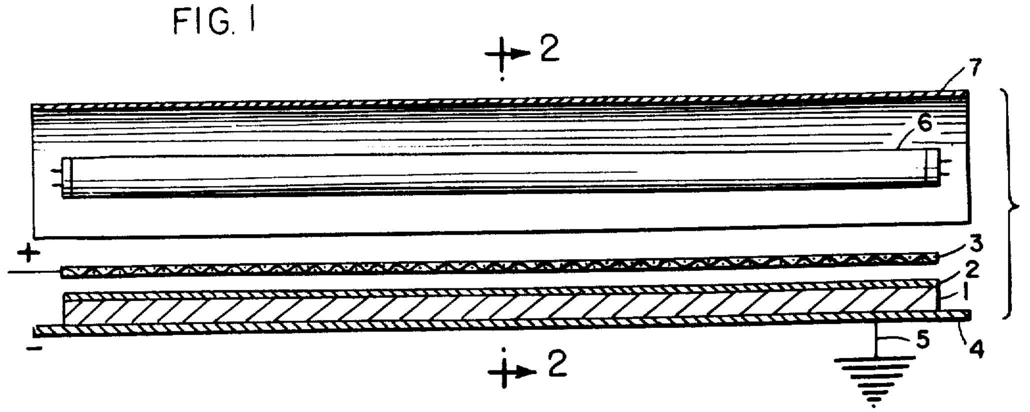
Figure 2:
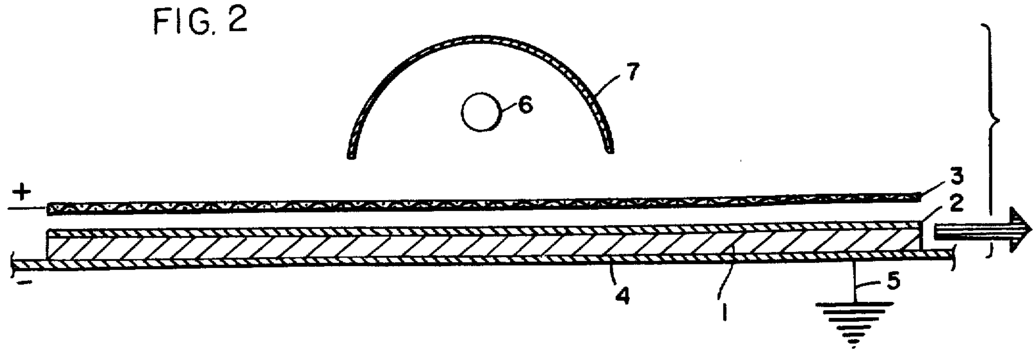

Referring to the drawing, a panel 1 is coated with a wet uncured coating composition 2 containing a photopolymerizable film-forming polymer. A wire mesh screen 3 which is substantially coextensive with the coating is positioned above the coating a relatively short distance, usually one-quarter inch or one-half inch, and constiatutes one of the electrodes employed to produce an electrostatic field. The other electrode is a plate 4 disposed in supporting relationship to panel 1 and also coextensive with electrode 3. The plate 4 can be grounded at 5 as shown. A high intensity light curing lamp 6 is positioned above the wire mesh electrode 3 so that the light waves therefrom can pass through the openings in the wire mesh electrode 3 and penetrate the coating 2. A reflector 7 is provided in order to direct the light waves on the coating 2.

The lamp 6 can be any high intensity lamp which will generate light waves having a wave length within the range of 1,850 to 4,000 angstroms. Usually the intensity of the light delivered to the surface of the coating would exceed 0.03 watts per centimeter squared although lower intensities can be used. The light can be generated continuously or in flashes. The light waves can be peaking or non-peaking types of light waves.

In practicing the invention it has been found that the best results are obtained when the wire mesh electrode is positive. It appears that increased activity is obtained when the positive charge is produced in this manner at the surface of the coating.

The invention will be further illustrated but is not limited by the following example in which the quantities are stated in parts by weight unless otherwise indicated.

EXAMPLE

A coating composition was prepared containing 55 parts styrene and 75 parts of 18.2% trimethylolpropane diallylether diethylenefumarate azelate with the addition of 2% of a 2% solution of GE SF 1023 silicone added for flow purposes and a sensitizer composed of 1.33% each of 2-naphthalenesulfonyl chloride and 1-chloromethylnaphthalene based on the weight of the resin. Wet films of this resin each 0.005 inch thick were applied to white maple panels primed with a standard polyvinyl chloride primer (15% Vinylite VAGH in an 85% mixture of xylene and methylisobutyl ketone).

The coated panels were placed between a large mesh screen having one-half inch openings and a steel plate as the electrodes with said screen between the coating and the lamp. The distance between the screen and the coating was approximately one-quarter inch to one-half inch and the lamp was approximately 1 inch from the coating.

The lamp used was a xenon field quartz helix of 200–225 mm pressure and an arc length of approximately 20–26 inches producing maximum energy in the visible and near ultraviolet. The lamp was arranged to deliver the light energy in flashes as described, for example, in U.S. Pat. No. 3,511,687, each flash being of very short duration (less than 500 microseconds). The lamp was flashed at 588 joules per flash. The plate 4 beneath panel 1 was grounded at 5 as illustrated in the drawing.

The electrostatic field used was generated with a high frequency (15 KC) halfwave rectifier direct current power supply with sufficient capacitance (0.0053 microfarads) in parallel to produce a field of essentially D.C. potential. The equipment limited the voltages to a range of from 1,000 volts D.C. to a maximum of 12,500 volts D.C. A special high voltage test probe with a vacuum tube voltmeter was used to measure and monitor the electrostatic field.

The coated panels were then exposed to 20 flashes of 588 joules per flash in one case without any electrostatic field, in a second case with 6,000 volt electrostatic field, and in a third case with 12,000 volt electrostatic field. When the panels were exposed to light curing without any electrostatic field, the coating was slightly tacky at the surfce and partially jelled or cured but wet at the primer interface. When exposed to light curing with the 6,000 volt electrostatic field there was a 70% gain in cure over the exposure without any electrostatic field. The coated panel exposed to the 12,000 volt electrostatic field was essentially mar resistant and showed a 100% gain in cure with respect to the coated panel which had been subjected to high energy light curing without the electrostatic field.

In another series of tests the electrostatic field was reversed with the screen electrode being negative and the plate positive. The negative field produced a cured film that was partially mar resistant while the positive field produced a cured film with excellent mar resistance.

It will be understood that the invention is not limited to any particular type of light source or to any particular type of high voltage electrostatic field. Nor is it limited to any particular type of coatings so long as the film-forming resins in the coatings are photopolymerizable by light wavs having wave lengths within the range of 1,850 to 4,000 angstroms. Any of the resin coatings described in U.S. Pat. No. 3,511,687 or U.S. Ser. No. 36,414 filed May 11, 1970, as well as the light sources described in said patent and patent application can be employed.

The panels containing the coatings can be exposed to high intensity light curing in an apparatus of the type described in U.S. Pat. No. 3,564,728 modified to provide an electrostatic field. The electrostatic field can be supplied by electrodes disposed above and below the coated panels in the manner described in the drawings herein and the panels and said electrodes can be movable or stationary with respect to one another during exposure of the coating to combined high intensity light curing and the electrostatic field.

The coatings which are subjected to treatment in accordance with the invention are usually 0.001 to 0.012 inch thickness after drying. One of the objects and advantages of the invention is to provide curing as rapidly as possible and to this end the time of treatment usually does not exceed sixty seconds. It will be understood, however, that long periods can be used and might be desirable in some instances.

When reference is made herein to a positive electrostatic field it will understood that this refers to an electrostatic field in which the positive electrode is positioned adjacent the coating of the coated substrate and the negative electrode is on the opposite side of the substrate. When the electrostatic field is negative the apertured electrode is negative and the plate electrode adapted to support the substrate is positive.

The process has been carried out with and without grounding one of the electrodes. It has also been carried out by inserting an asbestos sheet between the plate electrode and the substrate but it had been found that better results are obtained by having the plate electrode directly in contact with the substrate because the asbestos sheet reduced the current density of the electrostatic field due to its water content which provided too many leakage paths. This also had the effect of creating an imbalance in the electrostatic field resulting in "hot spots" on the coating.

The invention provides an apparatus wherein an article can be exposed both to high intensity light waves and an electrostatic field. While the invention is not limited to any theory, it is believed that the electrostatic field increases the reactivity by raising the available electrons to higher excited states or by effecting dipole orientation of the photosensitive entities in the electrostatic field.

It will be recognized that other variations and modifications can be made in the practical application of the invention.

The invention is hereby claimed as follows:

1. An apparatus for curing a film-forming coating of a photopolymerizable resin on a substrate which comprises a light source capable of emitting and directing light waves having wave lengths within the range of 1,850 to 4,000 angstroms on to the surface of a coated substrate coated with a coating of a film-forming photopolymerizable resin, and means for providing an electrostatic field at the surface of said coating of sufficient intensity to increase the rate of curing.

2. An apparatus as claimed in claim 1 wherein said last named means comprises a plate electrode adapted to support said coated substrate and an apertured electrode mounted adjacent to but spaced from said plate electrode, said apertured electrode being positioned so that the light waves from said light source pass through the apertures in said apertured electrode.

3. An apparatus as claimed in claim 2 in which said apertured electrode has a positive electrical potential and said plate electrode has a negative electrical potential thereby establishing a positive electrostatic field through the area normally occupied by said coated substrate.

4. An apparatus as claimed in claim 2 in which said apertured electrode has a negative electrical potential and said plate electrode has a positive electrical potential thereby establishing a negative electrostatic field through the area normally occupied by said coated substrate.

5. An apparatus for simultaneously applying light waves and an electrostatic field to an article which comprises a light source capable of emitting and directing light waves on to said article and means for providing an electrotatic field through said article comprising electrodes on opposite sides of said article, one of said electrodes being apertured and positioned to permit the passage of said light waves through said apertures of said article.

* * * * *